(12) United States Patent   (10) Patent No.: US 8,371,732 B2
Charnesky et al.   (45) Date of Patent: Feb. 12, 2013

(54) VEHICULAR DUCT WITH INTEGRATED LIGHTING

(75) Inventors: Scott P. Charnesky, Birmingham, MI (US); Jason W. Guenzel, Milford, MI (US); Mark R. Gordon, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 317 days.

(21) Appl. No.: 12/904,192

(22) Filed: Oct. 14, 2010

(65) Prior Publication Data

US 2012/0092883 A1    Apr. 19, 2012

(51) Int. Cl.
*B60Q 1/00* (2006.01)
(52) U.S. Cl. ........ 362/547; 362/511; 362/496; 362/498; 296/193.09; 296/193.1
(58) Field of Classification Search .................. 362/511, 362/496, 498, 505, 547; 296/193.09, 193.1
See application file for complete search history.

(56) References Cited

U.S. PATENT DOCUMENTS

| | | | |
|---|---|---|---|
| 4,724,515 A * | 2/1988 | Matsuki et al. | 362/503 |
| 7,683,395 B2 | 3/2010 | Huber et al. | |
| 7,841,756 B2 * | 11/2010 | Kracker et al. | 362/505 |
| 2007/0091632 A1 * | 4/2007 | Glovatsky et al. | 362/547 |
| 2010/0232174 A1 * | 9/2010 | Arakawa et al. | 362/547 |
| 2011/0051453 A1 * | 3/2011 | Nagasawa et al. | 362/547 |

FOREIGN PATENT DOCUMENTS

| | | |
|---|---|---|
| DE | 16300322 A1 | 5/1971 |
| DE | 102004047324 A1 | 4/2006 |

* cited by examiner

*Primary Examiner* — Evan Dzierzynski
(74) *Attorney, Agent, or Firm* — Quinn Law Group, PLLC

(57) ABSTRACT

A body panel for a vehicle includes an outer lens and a light engine projecting a light into the outer lens. The body panel includes a duct, which is disposed at a substantially equal vertical elevation as the outer lens. The light engine is positioned relative to the outer lens to allow the duct to pass directly behind the outer lens, at approximately the same vertical elevation, to improve air flow through the duct.

20 Claims, 3 Drawing Sheets

VEHICULAR DUCT WITH INTEGRATED LIGHTING

TECHNICAL FIELD

The invention generally relates to a body panel for a vehicle, and more specifically to a body panel having an integrated light.

BACKGROUND

Vehicles may include a body panel. The body panel may include, but is not limited to an air skirt disposed along a lower front edge of the vehicle. The body panel includes a frontal portion that defines an inlet. The body panel further defines an outlet disposed longitudinally rearward of the inlet along a longitudinal axis of the vehicle. A duct connects the inlet with the outlet in fluid communication. When the vehicle is moving, air is forced through the inlet, flows through the duct and exits through the outlet. Air flowing through the duct will alter the aerodynamic performance of the vehicle, i.e., it changes the flow field of air around a lower front corner of the body which can result in specific performance benefits. These benefits may include improved fuel economy, improved stability, improved handling and/or improved subsystem air cooling.

If the body panel is equipped with a light engine, such as a daytime running lamp and/or a fog lamp, the light engine is disposed directly behind the frontal portion. Because of the vertical space constraints of the vehicle, the duct and the light engine are disposed relative to the vehicle at about the same vertical elevation. Accordingly, the duct must extend behind and wrap around the light engine. When the duct is so configured, the airflow through the duct is diminished, thereby reducing the effectiveness of the body panel.

SUMMARY

A vehicle is provided. The vehicle includes a body having a forward end and a rearward end. The rearward end is spaced from the forward end a length along a longitudinal axis. A body panel is attached to the body. The body panel defines an inlet disposed at the forward end of the body, and an outlet disposed rearward of the inlet. A duct connects the inlet and the outlet in fluid communication. The duct is configured for conducting a flow of air from the inlet to the outlet. An outer lens is disposed at the forward end of the vehicle. A vertical center of the outer lens and a vertical center of the duct are disposed at a substantially equal vertical elevation relative to the body. The vehicle further includes a light engine that is configured for providing light to the outer lens. The light engine is positioned relative to the outer lens to allow the duct to pass directly behind the outer lens to maximize airflow through the duct.

A body panel for attachment to a body of a vehicle is also provided. The body panel includes a frontal portion defining an inlet, and an outlet disposed rearward of the inlet along a longitudinal axis. A duct connects the inlet and the outlet in fluid communication. The duct is configured for conducting a flow of air from the inlet to the outlet. An outer lens is attached to the frontal portion. A vertical center of the outer lens and a vertical center of the duct are disposed at a substantially equal vertical elevation relative to the frontal portion. The body panel further includes a light engine that is configured for providing light to the outer lens. The light engine is positioned relative to the outer lens to allow the duct to pass directly behind the outer lens to maximize airflow through the duct.

A vehicle is also provided. The vehicle includes a body panel, and a duct supported relative to the body panel. An outer lens is attached to the body panel. A vertical center of the outer lens and a vertical center of the duct are disposed at a substantially equal vertical elevation relative to the body panel. A light engine is configured for providing light to the outer lens. The light engine is positioned relative to the outer lens to allow the duct to pass directly behind the outer lens to maximize fluid flow through the duct.

Accordingly, by locating the light engine away from the outer lens, the duct may be shaped to pass directly behind the outer lens, which maximizes the flow of air flowing through the duct.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a vehicle is shown generally at 20.

Figure 1:
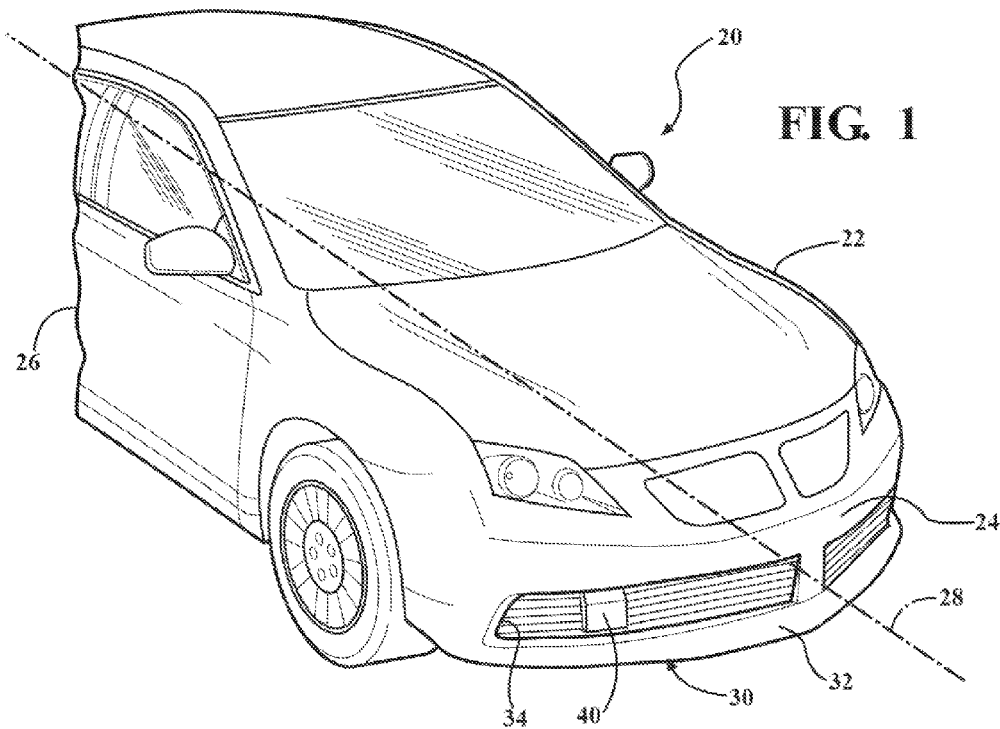
FIG. 1 is a schematic perspective view of a vehicle.
Figure 2:
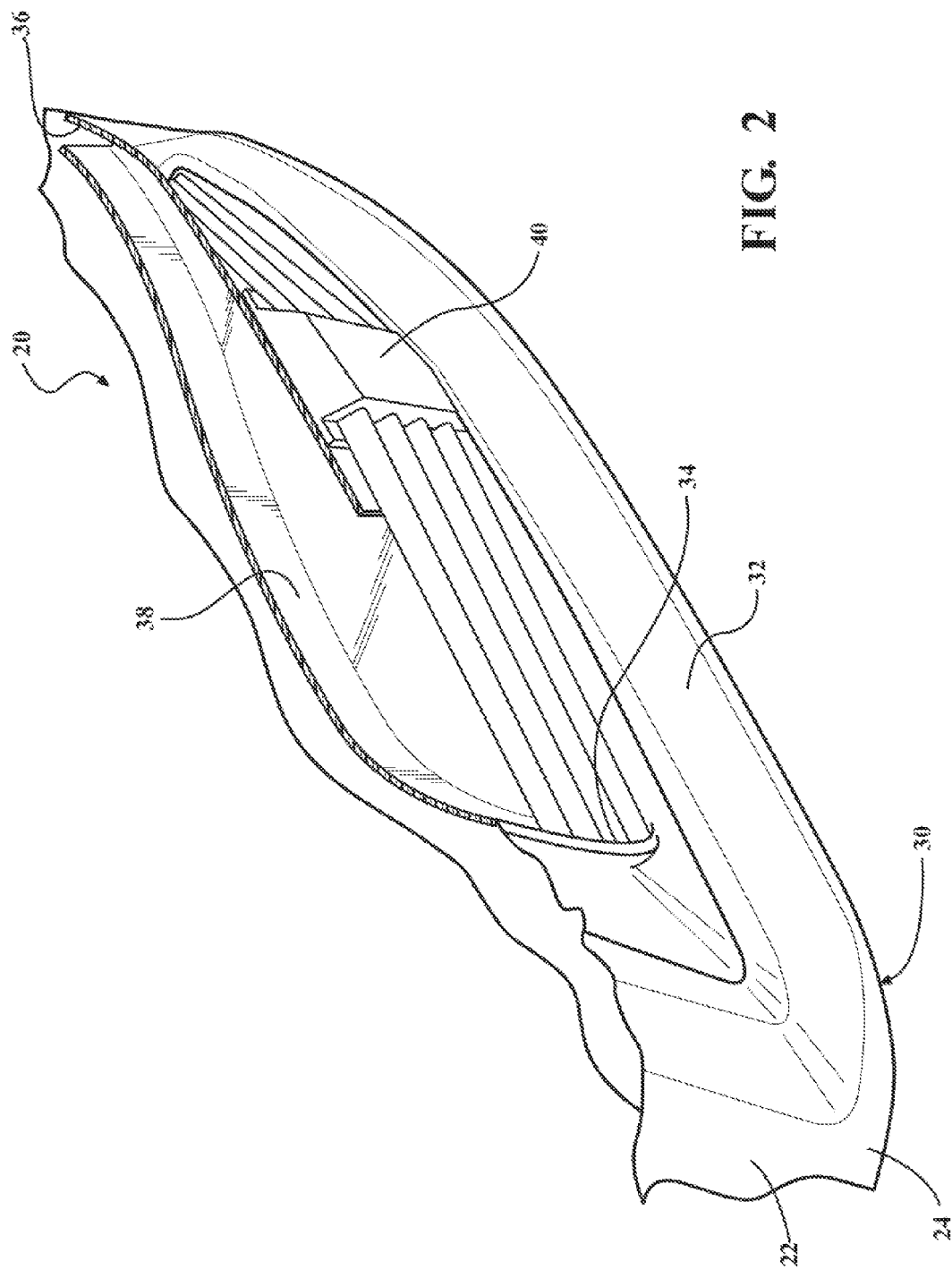
FIG. 2 is a schematic partial perspective view of an body panel for the vehicle.

Referring to FIGS. 1 and 2, the vehicle 20 includes a body 22 having a forward end 24 and a rearward end 26. The rearward end 26 is spaced from the forward end 24 a length along a longitudinal axis 28. It should be appreciated that the forward end 24 is associated with a front of the vehicle 20, and the rearward end 26 is associated with a back of the vehicle 20. The longitudinal axis 28 extends between the forward end 24 and the rearward end 26 of the body 22, along a longitudinal centerline of the body 22.

The vehicle 20 further includes a body panel 30. The body panel 30 may include, but is not limited to an air skirt. The body panel 30 is attached to the body 22. More specifically, the body panel 30 may include a frontal portion 32 that is attached to the body 22 at a lower vertical edge of the forward end 24 of the body 22. The frontal portion 32 may define at least one inlet 34. The inlet 34 is laterally offset from the longitudinal axis 28, i.e., from the longitudinal centerline of the body 22, and is disposed toward a lateral edge of the frontal portion 32. The inlet 34 is configured and/or shaped to gather air flowing laterally around the forward edge of the body 22, near the lower vertical edge of the body 22, when the vehicle 20 is moving in a forward direction. Accordingly, when the vehicle 20 is moving in the forward direction, air is forced around the body 22 and/or the body panel 30. A portion of the air moves laterally across the body panel 30, toward a side of the vehicle 20. The inlet 34 gathers some of the air flowing laterally across the body panel 30 toward the side of the vehicle 20, and allows the air to pass through the body panel 30. It should be appreciated that the frontal portion 32 may define multiple inlets 34 on either side of the longitudinal centerline of the body 22.

As shown in FIG. 2, the body panel 30 may further define an outlet 36. The outlet 36 is disposed rearward of the inlet 34. In other words, the outlet 36 is disposed nearer the rearward end 26 of the body 22 than the inlet 34. For example, the outlet 36 may be disposed within a front wheel well of the body 22, or along a side panel of the body 22. The outlet 36 exhausts the flow of air gathered from the inlet 34 during the forward movement of the vehicle 20.

The vehicle 20 includes a duct 38. The duct 38 may include any duct that defines a fluid passageway, including but not limited to an air duct. As shown in FIG. 2, the duct 38 connects the inlet 34 and the outlet 36 in fluid communication. The duct 38 is configured for conducting the flow of air from the inlet 34 to the outlet 36. However, it should be appreciated that the duct 38 may serve an alternative purpose, including but not limited to conducting air for brake cooling, or conducting air for between heat exchangers. Drawing some of the air flowing across the body panel 30 through the inlet 34 and exhausting the flow of air through the outlet 36 alters the aerodynamic behavior around a lateral front corner of the body 22, thereby offering performance benefits to the vehicle 20. Aerodynamic performance improvements to the vehicle 20 may include improved fuel efficiency, improved stability, improved handling and/or improved air cooling characteristics.

An outer lens 40 is attached to and supported by the body panel 30. The outer lens 40 is disposed at the forward end 24 of the vehicle 20. The outer lens 40 is configured to direct light in a generally forward direction. The outer lens 40 may include and be manufactured from any material capable of projecting light therethrough and suitable for use as a lens of a vehicle 20.

Because of space and/or packaging limitations of the vehicle 20, the outer lens 40 and the duct 38 are disposed at a substantially equal vertical elevation relative to the body 22 and/or a ground surface. More specifically, a vertical center of the outer lens 40, i.e., a vertical center of mass of the outer lens 40, and a vertical center of the duct 38, i.e., a vertical center of mass of the duct 38, are disposed at substantially the same vertical elevation, with the duct directly behind the outer lens. Accordingly, the duct 38 is at substantially the same vertical elevation as the outer lens 40. In order to maximize airflow through the duct 38, the duct 38 is configured to pass directly behind the outer lens 40. Throughout this specification, the phrase indicating that the duct 38 passes directly behind the outer lens 40 should be interpreted to mean that the duct 38 is sufficiently close to the outer lens 40 to prevent placement of a light engine 42, 44 between the duct 38 and the outer lens 40, but not necessarily in direct contact with the outer lens 40. Having the duct 38 pass directly behind the outer lens 40 allows the duct 38 to define a greater cross sectional flow area, increasing a flow rate of air capable of passing through the duct 38.

Figure 3:
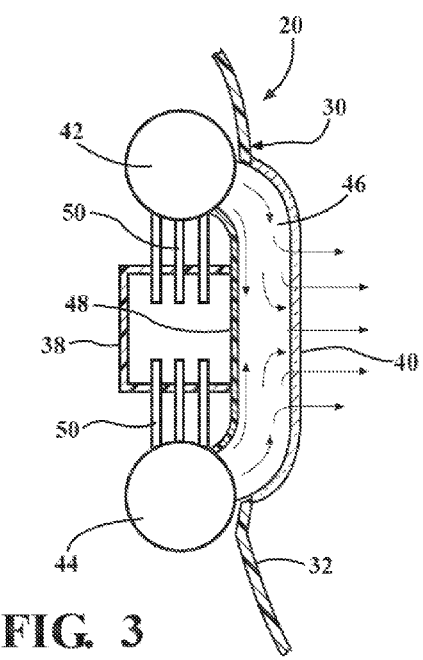
FIG. 3 is a schematic partial cross sectional view of the body panel.
Figure 4:
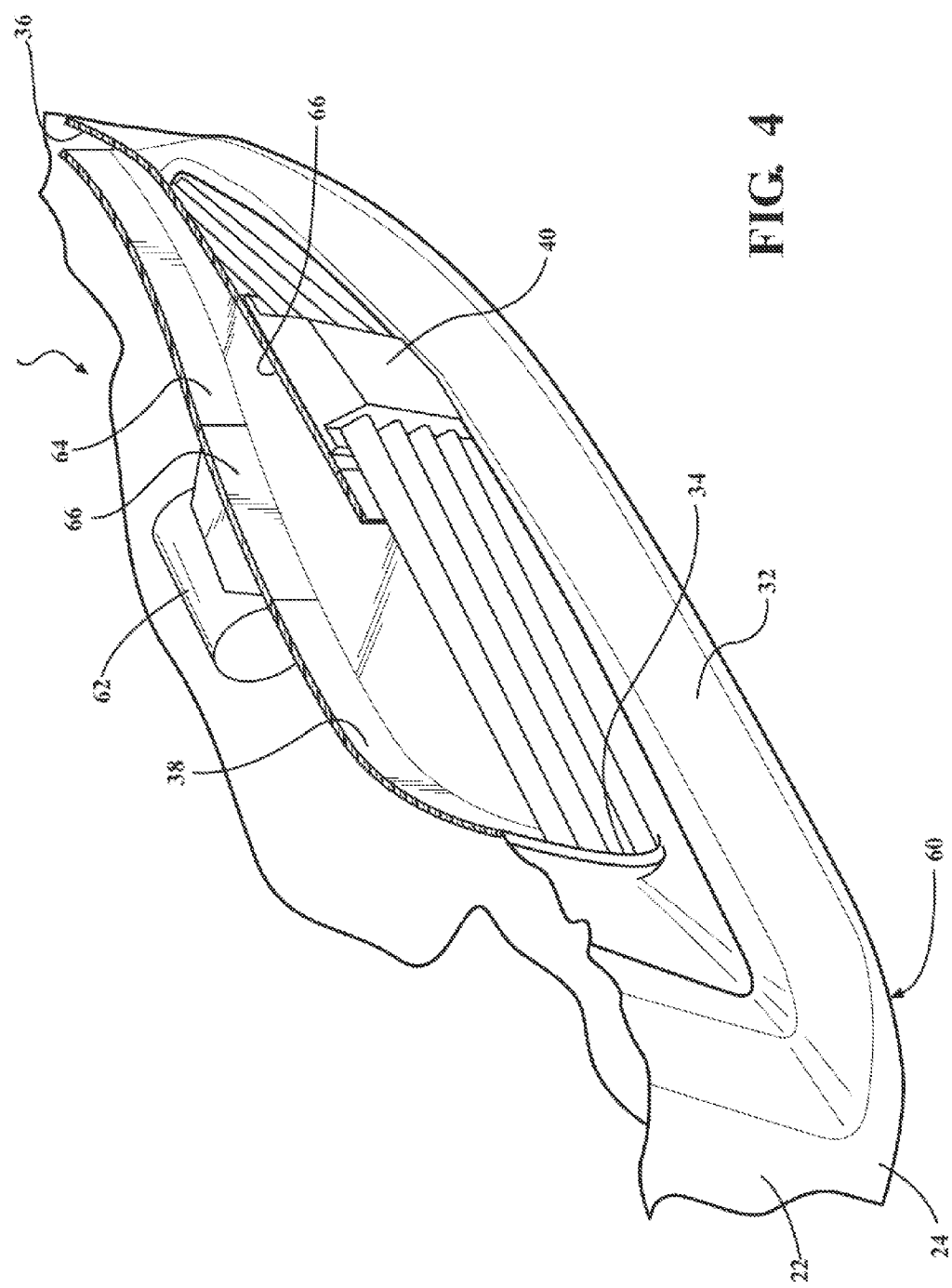
FIG. 4 is a schematic partial perspective view of an alternative embodiment of the body panel.

Referring to FIGS. 3 and 4, the vehicle 20 further includes a light engine 42, 44. The light engine 42, 44 is configured for providing light to the outer lens 40. The light engine 42, 44 may include, but is not limited to, one of a daytime running lamp, a fog lamp, a turn indicator lamp, a park indicator lamp, a position function lamp, or some other lamp not described herein. The light engine 42, 44 is positioned relative to the outer lens 40 to allow the duct 38 to pass directly behind the outer lens 40 to maximize airflow through the duct 38. Accordingly, the light engine 42, 44 may be spaced a distance vertically above the duct 38, a distance vertically below the duct 38 and/or a distance horizontally rearward of the duct 38. The light generated by the light engine 42, 44 is directed around or through the duct 38 onto the outer lens 40, so that the light may project outward.

As best shown in FIG. 3, the light engine 42, 44 includes a first light engine 42 and a second light engine 44. The first light engine 42 is located vertically above the duct 38, and the second light engine 44 is located vertically below the duct 38. Alternatively it should be appreciated that the vehicle 20 need only include only one of the first light engine 42 and the second light engine 44, i.e., the vehicle 20 need only include the first light engine 42 located above the duct 38, or the second light engine 44 located below the duct 38.

The vehicle 20 includes a light guide 46 at least partially disposed between the outer lens 40 and the duct 38. The light guide 46 is configured for transmitting light from the light engine 42, 44 to the outer lens 40. The light guide 46 may include any reflective tube or the like that is capable of conducting light from the light engine 42, 44 to the outer lens 40. A light housing 48 is disposed between the light guide 46 and the duct 38, and is configured for projecting light from the light guide 46 into the outer lens 40. The light housing 48 may include, but is not limited to, any suitable reflective material that is formable to properly direct the light onto the lens. It should be appreciated that while the duct 38 is located "directly behind" the outer lens 40, there exists sufficient space along the longitudinal axis 28 between the outer lens 40 and the duct 38 for the light guide 46 and the housing.

The light engine 42, 44 may include a heat sink 50 that is at least partially disposed and extends into the duct 38. The heat sink 50 is configured for transferring heat from the light engine 42, 44 to air flowing through the duct 38. The heat sink 50 may include, but is not limited to, metal plates that are attached to the light engine 42, 44 and extend into the duct 38, and that are capable of absorbing heat from the light engine 42, 44 and dissipating the heat into the flow of air flowing through the duct 38.

Figure 5:
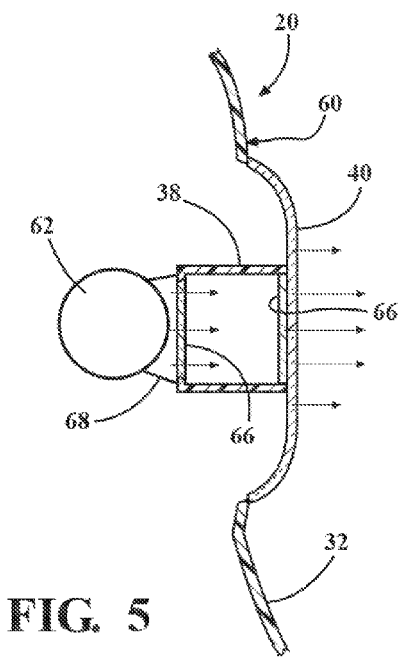
FIG. 5 is a schematic partial cross sectional view of the alternative embodiment of the body panel.

Referring to FIGS. 4 and 5, an alternative embodiment of the body panel is shown generally at 60. The body panel 60 includes a light engine 62 that is longitudinally offset along the longitudinal axis 28, rearward of the duct 38. Accordingly, the light engine 62 is disposed nearer the rearward end 26 of the body 22 than the portion of the duct 38 disposed directly behind the outer lens 40.

The duct 38 includes a wall 64 having a transparent portion 66. The transparent portion 66 of the wall 64 allows the light to project horizontally through the duct 38 and into the outer lens 40. It should be appreciated that the transparent portion 66 may include two opposing wall portions, i.e., a forward wall portion and a rearward wall portion. The transparent portion 66 may include and be manufactured from any material capable of transmitting light therethrough. Alternatively, the light engine 62 may include an inner lens 68 that defines a part of the transparent portion 66 of the duct 38, i.e., the light engine 62 includes an inner lens 68 that is also part of the wall 64 of the duct 38.

While the best modes for carrying out the invention have been described in detail, those familiar with the art to which this invention relates will recognize various alternative designs and embodiments for practicing the invention within the scope of the appended claims.

The invention claimed is:
1. A vehicle comprising:
a body having a forward end and a rearward end spaced from the forward end a length along a longitudinal axis;
a body panel attached to the body and defining an inlet disposed at the forward end of the body and an outlet disposed rearward of the inlet;

a duct connecting the inlet and the outlet in fluid communication and configured for conducting a flow of air from the inlet to the outlet;
an outer lens disposed at the forward end of the vehicle, wherein a vertical center of the outer lens and a vertical center of the duct are disposed at a substantially equal vertical elevation relative to the body; and
a light engine configured for providing light to the outer lens, wherein the light engine is positioned relative to the outer lens to allow the duct to pass directly behind the outer lens to maximize airflow through the duct.

2. A vehicle as set forth in claim 1 wherein the light engine is vertically offset relative to the duct.

3. A vehicle as set forth in claim 2 further comprising a light guide at least partially disposed between the outer lens and the duct and configured for transmitting light from the light engine to the outer lens.

4. A vehicle as set forth in claim 3 further comprising a light housing disposed between the light guide and the duct and configured for projecting light from the light guide into the outer lens.

5. A vehicle as set forth in claim 1 wherein the light engine includes a heat sink at least partially extending into the duct and configured for transferring heat from the light engine to air flowing through the duct.

6. A vehicle as set forth in claim 1 wherein the light engine is longitudinally offset along the longitudinal axis rearward of the duct.

7. A vehicle as set forth in claim 6 wherein the duct includes a transparent portion for projecting light through the duct and into the outer lens.

8. A vehicle as set forth in claim 7 wherein the light engine includes an inner lens defining a portion of the duct.

9. A vehicle as set forth in claim 1 wherein the light engine includes one of a daytime running lamp, a fog lamp, a turn indicator lamp, a park indicator lamp and a position function lamp.

10. A body panel for attachment to a body of a vehicle, the body panel comprising:
a frontal portion defining an inlet;
an outlet disposed rearward of the inlet along a longitudinal axis;
a duct connecting the inlet and the outlet in fluid communication and configured for conducting a flow of air from the inlet to the outlet;
an outer lens attached to the frontal portion, wherein a vertical center of the outer lens and a vertical center of the duct are disposed at a substantially equal vertical elevation relative to the frontal portion; and
a light engine configured for providing light to the outer lens, wherein the light engine is positioned relative to the outer lens to allow the duct to pass directly behind the outer lens to maximize airflow through the duct.

11. A body panel as set forth in claim 10 wherein the light engine is vertically offset relative to the duct.

12. A body panel as set forth in claim 10 further comprising a light guide at least partially disposed between the outer lens and the duct and configured for transmitting light from the light engine to the outer lens.

13. A body panel as set forth in claim 12 further comprising a light housing disposed between the light guide and the duct and configured for projecting light from the light guide into the outer lens.

14. A body panel as set forth in claim 10 wherein the light engine includes a heat sink at least partially extending into the duct and configured for transferring heat from the light engine to air flowing through the duct.

15. A body panel as set forth in claim 10 wherein the light engine is longitudinally offset along the longitudinal axis rearward of the duct.

16. A body panel as set forth in claim 15 wherein the duct includes a transparent portion for projecting light through the duct and into the outer lens.

17. A body panel as set forth in claim 16 wherein the light engine includes an inner lens defining a portion of the duct.

18. A body panel as set forth in claim 10 wherein the light engine includes one of a daytime running lamp, a fog lamp, a turn indicator lamp, a park indicator lamp and a position function lamp.

19. A vehicle comprising:
a body panel;
a duct supported relative to the body panel;
an outer lens attached to the body panel, wherein a vertical center of the outer lens and a vertical center of the duct are disposed at a substantially equal vertical elevation relative to the body panel; and
a light engine configured for providing light to the outer lens, wherein the light engine is positioned relative to the outer lens to allow the duct to pass directly behind the outer lens to maximize fluid flow through the duct.

20. A vehicle as set forth in claim 19 wherein the light engine is either vertically offset relative to the duct or longitudinally offset along a longitudinal axis relative to the duct.

* * * * *